US006571358B1

(12) United States Patent
Culotta et al.

(10) Patent No.: US 6,571,358 B1
(45) Date of Patent: May 27, 2003

(54) INTEGRATED MULTIPLE SERVICES SWITCH TESTING SYSTEM

(75) Inventors: Mark K. Culotta, Townsend, MA (US); Mark F. Childs, Westford, MA (US); Jeffrey L. Wise, Acton, MA (US); Stephen C. Miller, Groton, MA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 537 days.

(21) Appl. No.: 09/590,230

(22) Filed: Jun. 8, 2000

(51) Int. Cl.[7] ............................ H02H 3/05; G01R 31/08
(52) U.S. Cl. ............................ 714/33; 714/27; 714/30; 370/242; 370/244; 370/250
(58) Field of Search .................... 714/27, 33, 38, 714/43, 30; 370/242, 244, 250; 717/115, 124

(56) References Cited

U.S. PATENT DOCUMENTS

| | | | |
|---|---|---|---|
| 5,954,829 A | | 9/1999 | McLain, Jr. et al. ........ 714/712 |
| 6,373,822 B1 | * | 4/2002 | Raj et al. .................... 370/252 |
| 6,434,612 B1 | * | 8/2002 | Hughes et al. .............. 709/223 |
| 6,463,552 B1 | * | 10/2002 | Jibbe ............................ 714/33 |

* cited by examiner

Primary Examiner—Robert Beausoliel
Assistant Examiner—Emerson Puente
(74) Attorney, Agent, or Firm—Weingarten, Schurgin, Gagnebin & Lebovici LLP

(57) ABSTRACT

A system for integrated testing of one or more multi-service communications switches including a script execution environment for executing a test script. The script execution environment includes a hardware definition file storing a number of logical hardware device names corresponding to hardware devices used by the test script, including a system under test (SUT) and a number of hardware testing devices. The system further employs a network definition file including a plurality of logical connection names corresponding to connections between the hardware devices in the test environment. These connections in the network definition file are specified in terms of the logical hardware device names defined in the hardware definition file. The test script then refers to each of the hardware devices in the test environment using the logical hardware device names in the hardware definition file, and to the connections between the hardware devices using the logical connection names defined by the network definition file.

16 Claims, 3 Drawing Sheets

INTEGRATED MULTIPLE SERVICES SWITCH TESTING SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to automated testing systems, and more specifically to a method and a system for providing integrated, multiple service switch testing.

As communications switches have evolved, their designs have become increasingly complex. In particular, multiple communications protocols, and services related to those protocols, have been included within a single switching device. Such services may relate, for example, to the frame relay, cell relay (also known as Asynchronous Transfer Mode or ATM), and Internet Protocol (IP) internetworking communications protocols. Other services provided by a switch may relate to flow control over one or more virtual connections, and/or throughput or latency performance levels relating to various standard Quality of Service (QoS) parameters. A switch that supports multiple communications protocols may be referred to as a "multi-protocol" or "multi-service" switch.

The specific operation of a multi-service switch often may depend on how the switch is configured in terms of what modules are installed in the switch, as well as the traffic patterns flowing through the switch. Depending on the switch configuration, each supported communication service may operate simultaneously with any combination of a number of other potentially available services. Various communication services offered by a switch may not be completely independent in their operation. Accordingly, a multi-service communication switch presents an example of a system whose operation may significantly vary depending on its specific configuration and operating environment.

As a result of the aforementioned complexities inherent in multi-service switch design, effective testing of a multi-service switch can be challenging. Some existing testing approaches employ multiple separate hardware test devices ("testers") using independent control programs. Each separate tester has been used to separately test one or more specific associated functionalities within the device. In such an approach, a first tester might be used to test the frame relay function, another tester might be used to test the ATM functionality of the device, another tester might be configured to produce IP internetworking test data, and so on for each service type offered by the system under test. Use of multiple, dedicated hardware testers may necessitate any test control programs to be designed in a way that is based on the specific testers used in a given test. Such test control programs may not be useful when other specific testers are used. Additionally, in existing systems, test control programs are typically designed based on specific configurations of hardware testers. If two test control programs are designed based on two different configurations of the hardware testers, then time consuming re-cabling must be performed between execution of the two tests.

For these reasons, existing approaches to switch testing may fail to systematically and comprehensively provide a test of operation under many configurations. In addition, such individual test devices may make it difficult for a test engineer to efficiently perform a variety of tests, since the cabling connecting multiple independent test devices to multiple systems under test must often be changed to support individual tests.

For the above reasons, it would be desirable to have an integrated testing system and method which supports convenient testing of large numbers of configurations of a multi-service communications switch. The system should allow for simultaneous testing of multiple services offered by the switch, and further be capable of inter-operating with existing test devices.

BRIEF SUMMARY OF THE INVENTION

In accordance with the present invention, a system for integrated testing of one or more multi-service communications switches ("switches") is disclosed, including a script execution environment for executing at least one test script. For a given test script, the script execution environment includes a hardware definition file storing a number of logical hardware device names. Each of the logical hardware device names in the hardware description language corresponds to a hardware device that may be used by the associated test script. The hardware devices described by logical hardware device names in the hardware description file may include at least one system under test (SUT) consisting of a switch, as well as a number of hardware testing devices ("testers").

The disclosed system further employs a network definition file including a plurality of logical connection names corresponding to connections between the hardware devices in the test environment. These connections in the network definition file are specified in terms of the logical hardware device names defined in the hardware definition file.

A test script is further provided by the disclosed system, which also refers to each of the hardware devices in the test environment using the logical hardware device names in the hardware definition file, and which also refers to the connections between the hardware devices using the logical connection names defined by the network definition file.

In an illustrative embodiment, the hardware definition file further includes a loopback definition section, including a number of logical "loopback" names, associated with ports in one or more switches having their output link connected to their input link for loopback testing.

Further in an illustrative embodiment, the disclosed system includes a streams utility, accessible to the test script during execution, for configuring at least one stream, for use during execution of the test script. Such streams are configured with reference to logical hardware device names and logical connection names. Similarly, the disclosed system may provide a checks utility for establishing at least one check, wherein an established check may be used to collect statistics regarding a subset of data received on a specific communications link, and a connections utility for establishing virtual connections for use during a test. Each of the checks and connections utilities operate using the logical hardware device names and the logical connection names. Those skilled in the art will recognize that while the connections utility of the disclosed system is described with regard to support for protocols using virtual connections, the disclosed system is not limited to such applications, and that the disclosed system is also suitable for testing of connectionless protocols as well, such as IP.

Use of the disclosed hardware definitions file allows multiple tests which require the same hardware devices to share the same description of those devices. The hardware definitions file further allows a test script to be modified to use slightly different equipment by simply modifying the hardware definition file and not the test script itself. This advantageously provides a level of device independence. Each test script, therefore, does not have to be rewritten every time the equipment it uses changes. This device independence provided by the hardware description and network description files results from the fact that they completely describe, in a standard way, the equipment in use for a particular test run. In other words, the hardware description and network description files 1) contain the actual switch identifier numbers so that the test script need not be modified for each SUT, 2) describe each switch's card complement so that a single test script can test multiple card configurations, 3) specify the test equipment in use and describe the card complement of each 4) describe how the switches are cabled together, and 5) describe how the switches are cabled to test equipment. In this way there is provided a testing system which allows automated testing using a variety of testing equipment, and simplifies connection set-up and tear-down between testing of different switches and the use of different test equipment used to test them.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
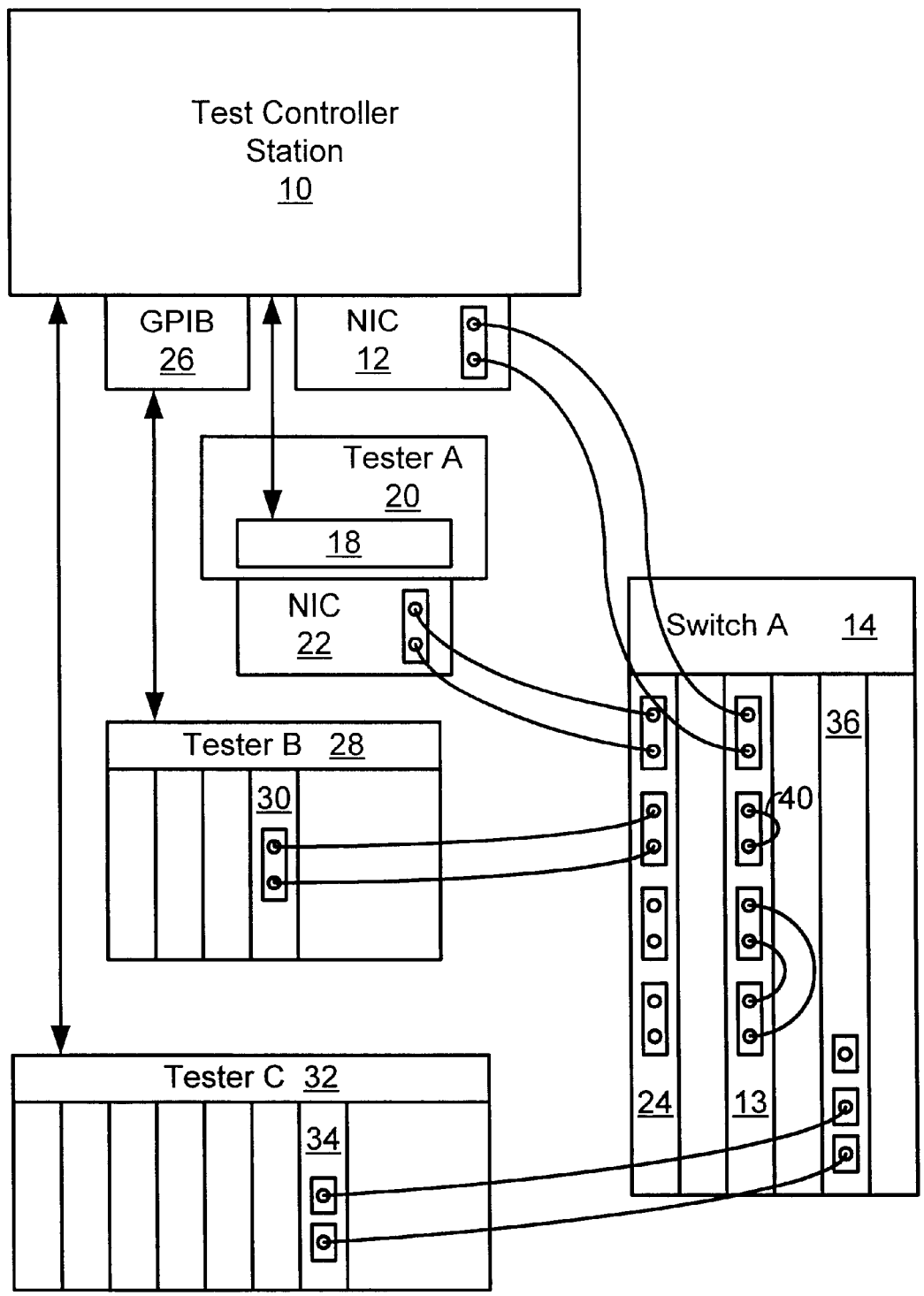
FIG. 1 is a block diagram showing devices arranged in an illustrative testing environment.

As shown in FIG. 1, an illustrative testing environment includes a test controller station 10, communicatively coupled via Network Interface Card (NIC) 12 to a card 13 within the switch A 14. In the illustrative testing environment of FIG. 1, the switch A 14 is the system under test (SUT). Further in FIG. 1, the test controller station is shown communicatively coupled to a test software module 18 within a hardware testing device tester A 20. The software module 18 is, for purposes of example, operative to provide testing of Internet Protocol (IP) related internetworking functionality in the switch A 14. The tester A 20 is shown communicatively coupled via NIC 22 to the card 24 in the switch A 14. For purposes of example, the tester A device 20 is a conventional workstation or personal computer, including one or more processors, memory, and I/O interfaces. The test controller station 10 is similarly a workstation or personal computer having one or more processors, memory, and I/O interfaces. In one embodiment, the test controller station 10 and the tester A are implemented within the same computer platform, albeit employing separate, cooperating software processes. Alternatively, the test controller station 10 and the tester A 20 may be implemented in separate hardware devices. In an illustrative embodiment, the switch A 14 is also provided with a craftsperson interface (CPI), which may optionally be connected to the test controller station 10, and through which are provided a number of scripts during the testing process which may be used to establish one or more virtual connections related to the specific tests being performed. The CPI interface of the switch A may alternatively be connected to a user interface separate from the test controller station 10. The scripts used to communicate with the switch A 14 through the CPI may include Tool Control Language (TCL) scripts, which are interpreted by software executing within the switch A 14 in order to establish any necessary virtual connections for a given test.

Further in FIG. 1, the test controller station 10 is shown communicatively coupled with a hardware testing device tester B 28, which in turn includes a card 30 that is communicatively coupled to the card 24 within the switch A 14. For purposes of illustration, communications between the test controller station 10 and the tester B are performed through a General Purpose Interconnect Bus (GPIB) interface 26 associated with the test controller station 10. For purposes of example, the hardware test device tester B 32 is employed to test communications services associated with the Asynchronous Transfer Mode (ATM) communications protocol. Accordingly, the card 30 within the tester B 28 may be an ATM interface card, capable of supporting and testing any ATM related functionality, and communicating using the ATM protocol with the card 24 within the switch A 14, which is also, for purposes of example, an ATM interface card.

Also with reference to FIG. 1, the test controller station 10 is shown communicatively coupled with a hardware testing device tester C 32, which is seen communicating through a card 34 with a card 36 in the switch A 14. For purposes of example, the tester C 32 is a frame relay testing device, and accordingly the card 34 may be a frame relay interface card, capable of testing any frame relay related functionality within the card 36 of the switch A 14.

Additionally shown in FIG. 1 is a self loop 40, which connects an output link of the card 13 to an input link of the same card 13.

While FIG. 1 shows a number of hardware testing devices operable to test communications services related to ATM, Frame Relay, and Internet Protocol internetworking functions, a person skilled in the art will recognize that the present invention is not limited to tests performed relating to only these communications protocols. To the contrary, the present invention is applicable to any testing environment in which multiple hardware testing devices are employed through multiple physical connections (cabling) to test a multi-function switch.

Figure 2:
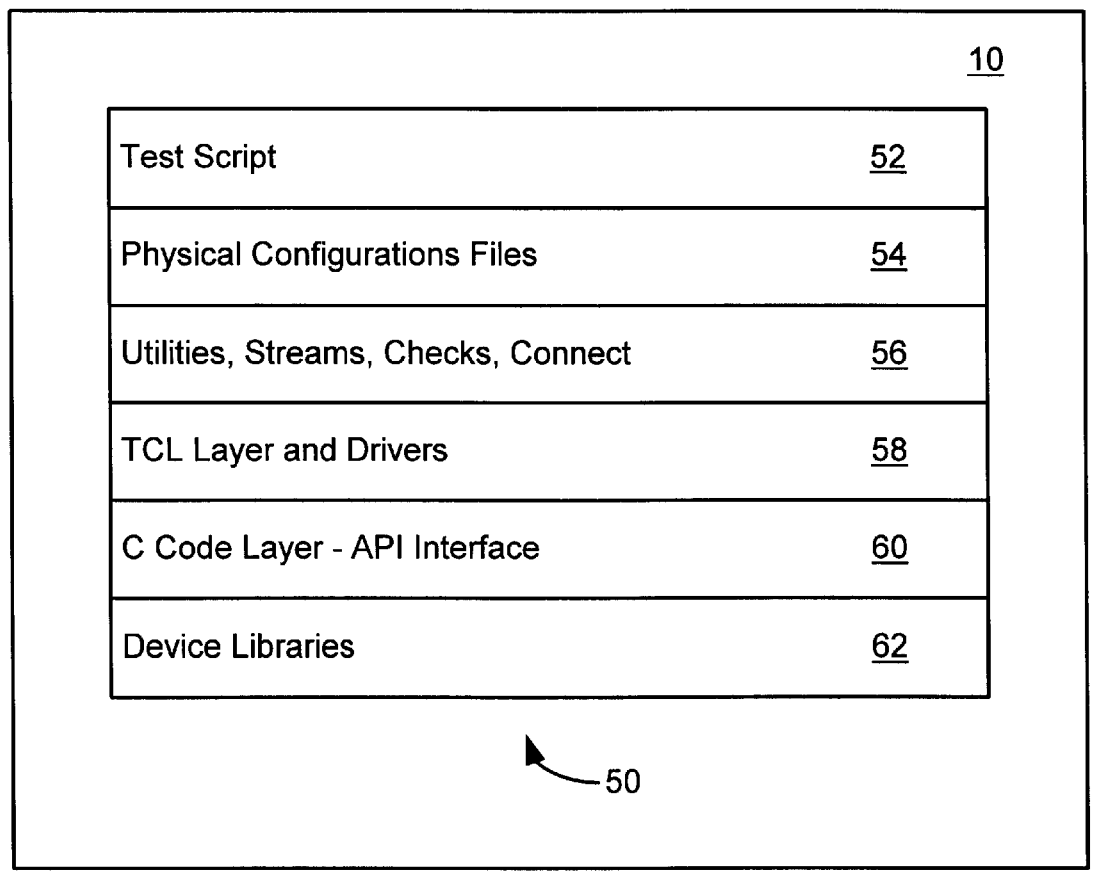
FIG. 2 is a block diagram showing elements in an illustrative test control station.

FIG. 2 shows an illustrative example of a test script execution environment 50 within the test controller station 10, corresponding to the test controller 10 shown in FIG. 1. The test script execution environment 50 is shown including a test script 52. While a single test script is shown in FIG. 2, multiple test scripts may alternatively be executed in parallel or in sequence. A number of physical configuration files 54 are shown in the test script execution environment 50. Such physical configuration files 54 may completely describe the testing devices and system or systems under test within a given test environment. Physical configuration files may be associated with individual test scripts, or shared among multiple test scripts which execute either simultaneously or in sequence. The physical configuration files may be used by the test script execution environment 50 to allocate dedicated testing devices for exclusive use by an indicated test script during execution of the test script, or simply to define logical names associated with the hardware testing devices and physical connections between testing devices and/or the system under test for use by one or more currently executing test scripts.

Further in FIG. 2, the test script execution environment 50 is shown including a number of utilities 56 for use by the test script 52. The utilities 56 can isolate differences between underlying test equipment. The utilities 56 may include tools for establishing logical relationships between the testing devices and/or system under test. For example, the utilities 56 may provide the ability for the test script 52 to define streams, checks, and/or connect constructs for specific tests. The processes of establishing streams, checks, and/or connections by the test script 52, whether performed using utilities 56 provided by the test script execution environment 50 or directly by the test script 52, may advantageously employ logical names for hardware devices within the testing environment 50 or physical connections between those hardware devices that are defined within the physical configurations files 54. Illustrative examples of streams, checks, and connections are described below with reference to the steps shown in FIG. 3. While streams, checks and connections are described in connection with the illustrative embodiment of FIG. 2, the present invention is not limited to those logical constructs. Instead, the logical names provided by the physical configuration files 54 of the disclosed system may be employed advantageously to logical constructs appropriate for any type of communications protocol or test, and not only those described in connection with the illustrative embodiments described herein.

Further shown in FIG. 2 is a TCL (Tool Control Language) layer 58 which provides for interpreting of the TCL script of the test script 52, and further includes a number of device drivers for one or more of the hardware testing devices used by the test script 52. A code layer 60 is further provided which includes program code in the C programming language which may be used to access the Application Programming Interface to one or more routines within the device libraries 62. The code layer 60 may also use TCL to access the Application Programming Interface. Software within the device libraries includes code that is specifically designed to control and/or communicate with one or more hardware testing devices that may be used during execution of the test script 52.

Figure 3:
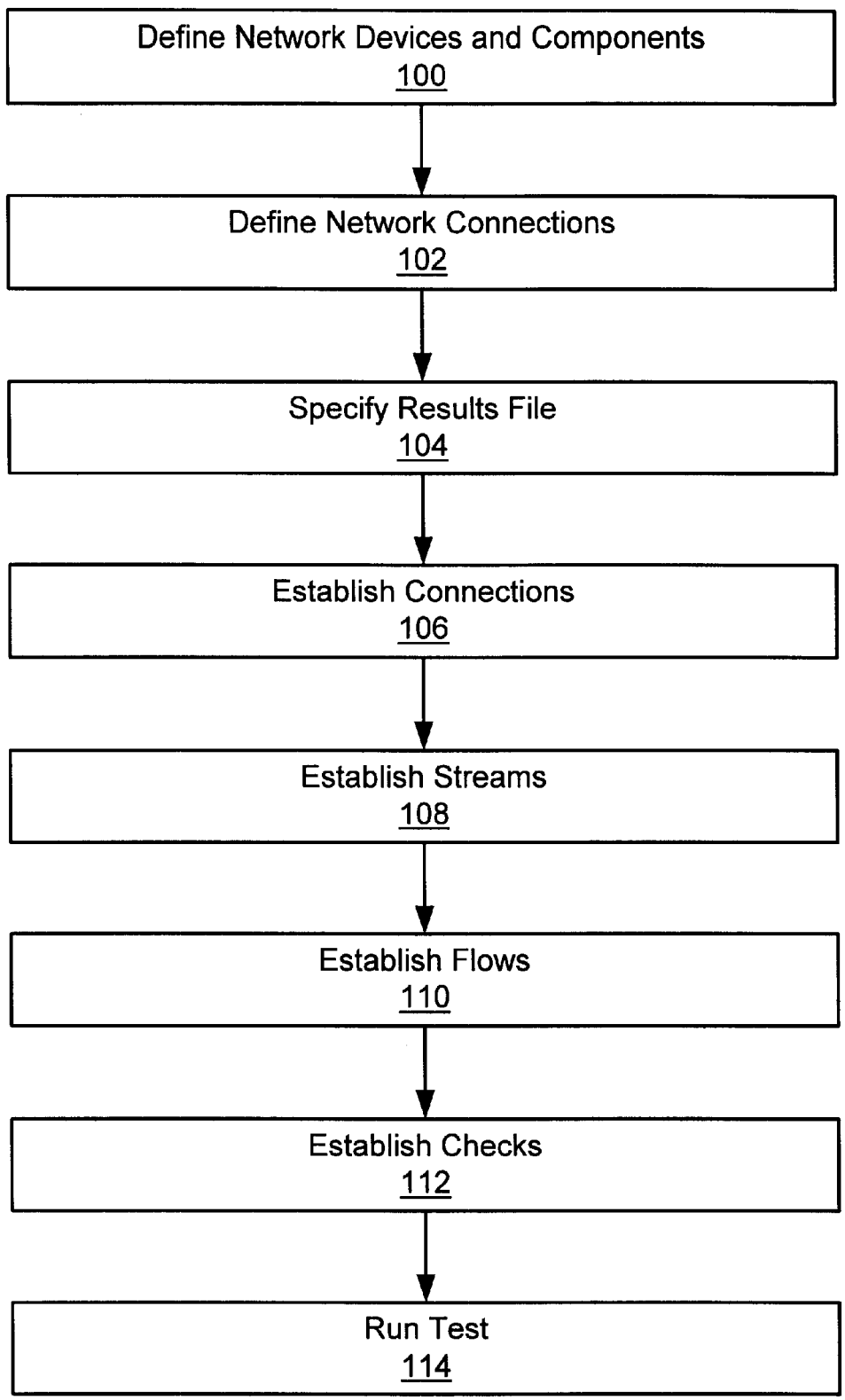
FIG. 3 shows steps performed to execute a test script.

FIG. 3 shows steps performed during an illustrative test script execution. At step 100, a number of network devices and components are defined, including a number of hardware testing devices and/or switches on which the test is to be performed. The purpose of step 100 is to describe the physical hardware which is to be used for a test, including the switch or switches being tested, including the types and locations of their I/O modules (also referred to as "interface cards" or "cards"), and hardware testing equipment, including the types and locations of their I/O modules (also referred to as "interface cards" or "cards"). Usually this information is described in a file which is separate from that of the test script, and referred to as a hardware definition file. A description of the contents of an illustrative hardware definition file is now provided. In order to initially form a hardware definition file, the disclosed system first creates a list of switch descriptions. Each individual switch description in this list is in the format:

{switchhostname {{slot type}...}}

The switchhostname is, for purposes of illustration, the Management IP hostname for that switch that is relevant to the test script. The IP hostname is the means through which the test controller station and any separate Craftsperson Interface (CPI) station communicate to the switches that are being tested. The rest of the switch definition consists of a list of IOM (Input/Output Module) declarations. Each IOM declaration is a two element list where the first part is the slot number, and the second is the IOM type. In an illustrative embodiment in which interfaces from the SONET communications protocol are used, the IOM type is one of the following SONET defined interface types:

OC12, OC3, DS3, E3

In an illustrative embodiment, it is not necessary to describe all the switches in the network, nor to describe all the I/O modules in each switch. It is only necessary to describe those switches and I/O modules needed for a particular test (though it does no harm to describe more).

An example is now provided describing the set up of two switches for an illustrative test script. The first switch has a management IP hostname of sw29 and contains OC3 type I/O Modules in slots 4 and 6. The second switch has a management IP hostname of sw60 and an OC12 type I/O Module in slot 2, as well as an E1 type Frame Relay I/O module in slot 11. To set up these two switches for a test, the test script execution environment sets the following variable, either in response to the test script itself, or through a command line interface:

```
set switch_list {
    {sw29 {{ 4 OC3}{6 OC3 }} }
    {sw60 {{ 2 OC12}{ 11 FR_E1}} }
```

In an illustrative embodiment, the test script execution environment or the test script itself calls a procedure which processes and stores the hardware definition information.

As an advantageous result of employing the disclosed system, the hardware description file is the only place a test will refer to the management IP hostname of a switch or the physical location of an IOM. Everywhere else, references will be logical (and ordinal), rather than physical. In other words, references to devices are made using descriptions of the devices having logical meanings relevant to the position of a device's definition within the hardware description file, such as "the second switch defined in the in hardware description file" or "the second IOM of the first switch defined in the hardware description file."

The disclosed system further creates a list of tester descriptions for the hardware testing devices ("testers") in a given testing environment associated with one or more test scripts. Each individual tester description in this list is in the format:

{tester_type hostname {{module type}...}}

The tester_type of each tester description may, for example, indicate a brand or model of hardware testing device. In an illustrative embodiment, for example, hardware testing devices provided by companies such as ADTECH™ of Honolulu Hawaii (e.g. ADTECH model AX/4000), or Hewlett-Packard™ (e.g. model HP BSTS) may be employed, in which case the tester type field may be used to indicate such tester types. The hostname field of each tester description may be used to indicate a IP host name of the associated tester itself, or of a workstation that is used to control a tester. The last portion of each tester description is a list of module numbers (the "module" field) and module types (the "type" field). Each module number is the physical location within the associated testers card cage, starting on the tester's left with 1. In an illustrative embodiment, for one example of a tester, the module type may indicate that the module within the tester is capable of testing communications services associated with the following communications protocols: frame relay over a T1 link (type=FR_T1), frame relay over a DS1 link (type=FR_DS1), frame relay over an E1 link (type=FR_E1), and others. Note that it is not necessary to describe all the testers in the testing environment or to describe all the modules in each tester. It is only necessary to describe those testers and modules needed for a particular test script or scripts. It generally does no harm to describe more, however, in an illustrative embodiment in which testing resources are allocated to an associated test script based on the contents of the hardware description file, the resources described in that hardware description file will be unavailable for concurrent use by other scripts or test engineers for the duration of the test.

An example is now provided for setting up two illustrative testers. The first tester ("tester1") is a first brand of tester, and has modules supporting the SONET OC3 communications protocol in slots 1 and 2. The second tester is a second brand of tester, is called "tester2", and has a T1 frame relay module in slot 4 and an E1 frame relay module in slot 5.

```
set tester_list {
            {ADTECH tester1{{1 OC3} {2 OC3}} }
            {HP       tester2{{4 FR_t1} {5 FR_E1 }}
            }
```

As with the switch descriptions, all subsequent references to a tester or tester module in a test script will be in terms of the order in which they were defined in the hardware description file, not their physical location.

At step 102 of FIG. 3, the disclosed system sets up descriptions for a number of network connections describing the physical interconnections between testers and the system or systems under test. The purpose of this step is to describe the physical connections used for a test or set of tests. In some tests, the physical connections described include those from one switch link to another (whether on the same or different switch). In an illustrative embodiment, physical connection information is described in a file which may be separate from that of the test script, and which may be called a "network definition" file. Such an approach permits multiple tests requiring the same (or similar) connections to share the same network connection description. The network description file is generally not explicitly read into the test script execution environment by a test script itself. Instead, it is usually passed as a command line argument to the test script execution environment, after passing in of the hardware description file. The test script execution environment then reads the network description file before reading in the test script file itself.

Formation of an illustrative network description file is now described. To form a network description file, the disclosed system first creates a list of switch-tester connections. Each individual connection description in this switch-tester list is of the format:

{{switch_num port_num link_num}{tester_num tester_module}}

As shown above, each element of the switch-tester list includes numbers corresponding to the switch number ("switch_num"), port (or slot) number ("port_num"), link number ("link_num"), tester number ("tester_num"), and tester module number ("tester_module") for an associated physical connection between hardware devices within the testing environment. Each number within an element of the network description file is based on the order in which the item was defined in the hardware description file.

There is now described illustrative definitions for two switch-tester physical connections within the network description file. The first switch-tester connection is between the $3^{rd}$ link of the $2^{nd}$ slot of the $1^{st}$ switch and the $2^{nd}$ module of the $1^{st}$ tester, with all ordinal references based on the order in which the hardware devices were defined in the hardware description file. The second connection is between the $3^{rd}$ link of the $1^{st}$ slot of the $2^{nd}$ switch and the $3^{rd}$ module of the $1^{st}$ tester.

```
set swtch_tst_links {\
              {{ 1 2 3 } { 1 2 }}\
              {{ 2 1 3 } { 1 3 }}/
```

Further in an illustrative embodiment, the disclosed system may also create a separate list, within the network description file, of switch "loopback" connections, which are physical connections in which a link's output is connected to its own input. Each endpoint for an individual loopback connection description in this list is in the format:

{switch_num port_num link_num}

The terms within each loopback connection definition have similar definitions as described above for switch-tester connection definitions. The following example describes a connection between the $3^{rd}$ link of the $2^{nd}$ slot of the $1^{st}$ switch and the $3^{rd}$ link of the $4^{th}$ slot of the $2^{nd}$ switch.

```
set swtch_swtch_links {\
              {{ 1 2 3 } { 2 4 3 }}\
              {{ 2 4 3 } { 1 2 3 }}\
              }
```

In an illustrative embodiment, the test script execution environment or the test script itself calls a procedure which processes and stores the network connection information.

At step 104, the test script specifies a number of result file parameters. This portion of test script logic describes a file or files to use to report the test results associated with the test script and whether the append the result file to an existing result file or to create a new result file. The test script may further specify in this step the order of the columns within the result file, where the columns each are associated with a statistic for one or more of the checks established in step 112.

At step 106, a number of virtual connections relevant to the testing performed by the test script are established. A data structure is formed for each such virtual connection, describing that virtual connection. Each time a virtual connection is created, its unique name is appended to a global variable, which can be used to load multiple connections at one. In the case of an ATM virtual connection, the disclosed system sets any traffic parameters associated with the connection at this step, as well as the maximum burst size for the connection. Also at step 106 the disclosed system specifies the ingress and egress links for the connection and the class of service applicable to the connection. Additionally, an indication is stored as to whether the connection is an ATM VCC or VPC type connection. In the case of a Frame Relay connection, the disclosed system also creates a data structure associated with the connection at step 106. A connection name is similarly appended to a global variable associated with all Frame Relay connections in the testing environment, in order to load multiple such connections simultaneously. A data structure associated with a Frame Relay virtual connection is used to store information describing the ingress and egress for that connection, including logical port numbers, the connection type, for example Frame Relay to ATM or Frame Relay to Frame Relay, parameters related to the bandwidth of the connection, such as flow control related parameters and quality of service parameters, and any other desired parameters appropriate for the test to be performed using the connection. The virtual connections defined at step 106 are then loaded into the specific devices within the testing environment, and any identifying parameters received from the test devices, such as actual VCI/VPI values, are stored for future use.

As previously noted, while the illustrative embodiment is described with reference to testing of a communications protocol employing virtual connections, the disclosed system is not so limited in application, but is suitable for testing of any communications protocol, including connectionless protocols such as IP.

At step 108, a number of traffic streams are established that are to be used during execution of the test script. Each traffic stream is associated with a data structure describing it, and is assigned a unique stream identifier. For each traffic stream established at step 108, the disclosed system specifies: 1) the stream ingress, 2) whether the stream is one for which a minimum number of cells must be received before stopping a test run (an "under test" stream), 3) when to timeout waiting for cells, if at all, 4) the statistics to be gathered at an analyzer device associated with the stream, 5) a limits list to apply to any statistics gathered, used in conjunction with such statistics to determine whether the test was passed or failed, 6) what type of cell capture is to take place in association with the test, if any, and 7) a traffic descriptor defining the data rate (or bandwidth) and traffic pattern parameters.

In step 110, the disclosed system establishes one or more data flows to load onto one or more traffic streams established at step 108. In other words, at step 110, the disclosed system defines what specific data to send over one or more of the traffic streams. Each flow defined at step 110 defines a type of Protocol Data Unit (PDU), including the VPI/VCI, CLP, PT and GFC values of the PDU, and how many times it is to be transmitted in a row. Accordingly, a single flow maps to a single connection in ATM. One or more flows may be combined together to form a traffic stream.

At step 112 the disclosed system establishes a number of checks which analyze the egresses of a list of traffic streams. This step specifically establishes data structures associated with each such check, and specifies: the list of egresses for which to create checks prior to test execution, and the list of traffic streams to use. The disclosed system then loads the check parameters into the associated testers, and configures the necessary testers to perform the test. At step 114, the test is executed, in which traffic is actually generated and analyzed, and results reported. The test script execution environment, under the control of the test script, starts any testers used for the test. During the test, traffic is generated and received until a test termination condition is reached, such as receipt of a specified minimum number of cells on each traffic stream in a list of traffic streams associated with the test script. The testers are then stopped, and statistics gathered on the received data are then compared to the acceptable limits for each respective test parameter. Test results are then printed into one or more previously specified results files.

While the embodiment of FIG. 3 describes a number of steps in a particular order for purposes of illustration, the ordering shown and described is not a limitation of the present invention, and other orderings, especially with regard to steps 106 through 114, may be used in various alternative embodiments.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modifications to and variations of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A system for integrated testing of at least one multiple-services communications switch, wherein said system includes a memory operable to store at least one computer program, a processor operable to execute said at least one computer program, and a test script execution environment for processing at least one test script, said test script execution environment comprising:

a hardware definition file, stored within said, defining logical hardware device names for corresponding ones of a plurality of hardware devices, wherein said plurality of hardware devices include at least one system under test and a plurality of hardware testing devices;

a network definition file, stored within said memory, defining a plurality of logical connection names for corresponding ones of a plurality of physical connections between respective ones of said plurality of hardware devices, wherein said physical connections are represented within said network definition file in terms of said plurality of logical hardware device names; and a test script referring to each of said plurality of hardware devices using corresponding ones of said plurality of logical hardware device names, and wherein said test script refers to each of said plurality of connections using corresponding ones of said logical connection names.

2. The system of claim 1, wherein said logical hardware device names comprise numbers corresponding to an order in which said hardware devices are defined in said hardware definition file.

3. The system of claim 1, wherein said logical connection names comprise numbers corresponding to an order in which said plurality of physical connections are defined in said network definition file.

4. The system of claim 1, wherein said network definition file further comprises a loopback definition section, said loopback definition section defining at least one physical connection in which an output of one of said hardware devices is connected to its own input.

5. The system of claim 1, further comprising a streams utility for configuring at least one traffic stream, wherein said at least one traffic stream is configured with reference to at least one of said plurality of logical hardware device names and at least one of said logical connection names.

6. The system of claim 5, further comprising a test check utility for establishing at least one test check, wherein said test check defines a number of statistics to be determined by one of said hardware testing devices regarding data received on a egress link associated with said traffic stream.

7. The system of claim 1, wherein said hardware definition file and said network definition file are stored within a common file.

8. The system of claim 1, wherein said hardware definition file and said network definition file are stored within said test script.

9. A method for integrated testing of at least one multiple-services communications switch using a script execution environment for executing at least one test script, comprising:
   defining, responsive to a hardware definition file, a number of logical hardware device names for corresponding ones of a plurality of hardware devices, wherein said plurality of hardware devices include at least one system under test and a plurality of hardware testing devices;
   defining, responsive to a network definition file, a plurality of logical connection names for corresponding ones of a plurality of physical connections between respective ones of said plurality of hardware devices, wherein said physical connections are represented within said network definition file in terms of said plurality of logical hardware device names;
   executing at least one test script referring to each of said plurality of hardware devices using corresponding ones of said plurality of logical hardware device names; and
   referring, by said test script, to each of said plurality of connections using corresponding ones of said logical connection names.

10. The method of claim 9, wherein said step of defining said logical hardware device names further comprises defining said logical hardware device names as numbers corresponding to an order in which said hardware devices are defined in said hardware definition file.

11. The method of claim 9, wherein said step of defining said logical connection names further comprises defining said logical connection names as numbers corresponding to an order in which said plurality of physical connections are defined in said network definition file.

12. The method of claim 9, further comprising defining, as a portion of said network definition file, a loopback definition section, wherein said loopback definition section defines at least one physical connection in which an output of one of said hardware devices is connected to its own input.

13. The method of claim 9, further comprising configuring at least one traffic stream with reference to at least one of said plurality of logical hardware device names and at least one of said logical connection names.

14. The method of claim 13, further comprising establishing at least one test check defining a number of statistics to be determined by one of said hardware testing devices regarding data received on a egress link associated with said traffic stream.

15. A computer program product including a computer readable medium, said computer readable medium having a computer program for integrated testing of at least one multiple-services communications switch stored thereon, said program comprising:
   program code for defining, responsive to a hardware definition file, a number of logical hardware device names for corresponding ones of a plurality of hardware devices, wherein said plurality of hardware devices include at least one system under test and a plurality of hardware testing devices;
   program code for defining, responsive to a network definition file, a plurality of logical connection names for corresponding ones of a plurality of physical connections between respective ones of said plurality of hardware devices, wherein said physical connections are represented within said network definition file in terms of said plurality of logical hardware device names; and
   program code for executing at least one test script referring to each of said plurality of hardware devices using corresponding ones of said plurality of logical hardware device names, wherein said test script refers to each of said plurality of connections using corresponding ones of said logical connection names.

16. A system for integrated testing of at least one multiple-services communications switch using a script execution environment for executing at least one test script, comprising:
   means for defining, responsive to a hardware definition file, a number of logical hardware device names for corresponding ones of a plurality of hardware devices, wherein said plurality of hardware devices include at least one system under test and a plurality of hardware testing devices;
   means for defining, responsive to a network definition file, a plurality of logical connection names for corresponding ones of a plurality of physical connections between respective ones of said plurality of hardware devices, wherein said physical connections are represented within said network definition file in terms of said plurality of logical hardware device names; and
   means for executing at least one test script referring to each of said plurality of hardware devices using corresponding ones of said plurality of logical hardware device names.

* * * * *